United States Patent
Moravek et al.

(10) Patent No.: US 10,839,701 B2
(45) Date of Patent: Nov. 17, 2020

(54) METHODS AND SYSTEMS FOR STABILIZED APPROACH ENERGY MANAGEMENT

(71) Applicant: HONEYWELL INTERNATIONAL INC., Morris Plains, NJ (US)

(72) Inventors: Zdenek Moravek, Rozdrojovice (CZ); Ivan Lacko, Brno (CZ); Stepan Dopita, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 235 days.

(21) Appl. No.: 16/000,082

(22) Filed: Jun. 5, 2018

(65) Prior Publication Data
US 2019/0371187 A1    Dec. 5, 2019

(51) Int. Cl.
*G08G 5/02* (2006.01)
*B64D 45/04* (2006.01)
*G08G 5/00* (2006.01)

(52) U.S. Cl.
CPC ............ *G08G 5/025* (2013.01); *B64D 45/04* (2013.01); *G08G 5/0021* (2013.01)

(58) Field of Classification Search
CPC ....... G08G 5/025; G08G 5/0021; B64D 45/04
See application file for complete search history.

(56) References Cited

U.S. PATENT DOCUMENTS

| | | |
|---|---|---|
| 3,559,481 A | 2/1971 | Vietor |
| 4,319,219 A | 3/1982 | Rein-Weston |
| 6,112,141 A | 8/2000 | Briffe |
| 6,389,355 B1 | 5/2002 | Gibbs et al. |
| 6,584,382 B2 | 6/2003 | Karem |
| 6,629,023 B1 | 9/2003 | Silder, Jr. et al. |
| 7,068,187 B2 | 6/2006 | Ishihara et al. |
| 7,132,960 B2 | 11/2006 | Glover |
| 7,212,135 B1 | 5/2007 | Lynch et al. |
| 7,308,343 B1 | 12/2007 | Horvath et al. |
| 7,436,323 B2 | 10/2008 | Ishihara et al. |
| 7,471,997 B2 | 12/2008 | Tezuka |

(Continued)

OTHER PUBLICATIONS

USPTO Notice of Allowance for U.S. Appl. No. 14/967,557 dated Jul. 26, 2018.

(Continued)

*Primary Examiner* — Calvin Cheung
(74) *Attorney, Agent, or Firm* — Lorenz & Kopf, LLP

(57) ABSTRACT

Methods and systems are provided for guiding or otherwise assisting operation of a vehicle to intersect a stabilized approach to a destination. One exemplary method of assisting an aircraft for landing at an airport involves obtaining, from a system onboard the aircraft, a current position of the aircraft and a current velocity of the aircraft, determining a descent strategy for the aircraft from the current position to an initialization point for a stable approach to the airport based at least in part on the current position and the current velocity, and providing indication of the descent strategy on a display device. The descent strategy is determined based on one or more validation criteria associated with the initialization point so that one or more predicted values for one or more characteristics of the aircraft satisfy the one or more validation criteria at the initialization point.

19 Claims, 5 Drawing Sheets

(56) References Cited

U.S. PATENT DOCUMENTS

| | | | |
|---|---|---|---|
| 7,647,140 B2 | 1/2010 | Demortier et al. | |
| 7,818,100 B2 | 10/2010 | Goodman et al. | |
| 7,957,878 B2 | 6/2011 | Rado | |
| 8,014,912 B2 | 9/2011 | Zadrozynski et al. | |
| 8,024,078 B2 | 9/2011 | Coulmeau et al. | |
| 8,126,599 B2 | 2/2012 | Coulmeau | |
| 8,126,600 B2 | 2/2012 | Conner | |
| 8,170,727 B2 | 5/2012 | Deker | |
| 8,346,412 B2* | 1/2013 | Lacaze | G01C 23/00 244/187 |
| 8,412,392 B2 | 4/2013 | Jayathirtha et al. | |
| 8,436,750 B2 | 5/2013 | Fabre | |
| 8,532,844 B2 | 9/2013 | Wilson et al. | |
| 8,566,012 B1* | 10/2013 | Shafaat | G08G 5/0008 701/116 |
| 8,682,580 B2 | 3/2014 | Clark et al. | |
| 8,774,989 B1 | 7/2014 | Bush et al. | |
| 8,781,654 B2 | 7/2014 | Giovannini et al. | |
| 9,188,978 B2* | 11/2015 | Sacle | G01C 21/20 |
| 9,378,645 B2* | 6/2016 | Berrajaa | G05D 1/00 |
| 9,423,799 B1* | 8/2016 | Wu | G05D 1/042 |
| 9,711,055 B2* | 7/2017 | Vesely | G08G 5/045 |
| 9,934,692 B2 | 4/2018 | Lacko et al. | |
| 2002/0039070 A1 | 4/2002 | Ververs et al. | |
| 2004/0044446 A1 | 3/2004 | Staggs | |
| 2005/0261813 A1 | 11/2005 | Ryan et al. | |
| 2006/0025901 A1 | 2/2006 | Demortier et al. | |
| 2006/0200279 A1* | 9/2006 | Ainsworth | G08G 5/025 701/16 |
| 2006/0265110 A1* | 11/2006 | Ferro | G01C 23/00 701/3 |
| 2007/0142982 A1 | 6/2007 | Lorido | |
| 2008/0140272 A1* | 6/2008 | Zadrozynski | G08G 5/0021 701/14 |
| 2008/0162092 A1 | 7/2008 | Coulmeau et al. | |
| 2008/0195301 A1 | 8/2008 | Fabre | |
| 2008/0249675 A1 | 10/2008 | Goodman | |
| 2008/0262665 A1* | 10/2008 | Coulmeau | G08G 5/0039 701/16 |
| 2008/0312779 A1* | 12/2008 | Sacle | G01C 23/005 701/7 |
| 2009/0018713 A1 | 1/2009 | Coulmeau et al. | |
| 2009/0043434 A1* | 2/2009 | Deker | G05D 1/0676 701/16 |
| 2009/0048724 A1 | 2/2009 | Caule | |
| 2009/0319105 A1 | 12/2009 | Conner | |
| 2010/0036551 A1 | 2/2010 | Lacaze et al. | |
| 2010/0191394 A1 | 7/2010 | Villaume | |
| 2010/0286852 A1 | 11/2010 | Bouquet | |
| 2010/0318244 A1* | 12/2010 | Gomez | G01C 21/00 701/3 |
| 2011/0082605 A1 | 4/2011 | Coulmeau et al. | |
| 2011/0118908 A1* | 5/2011 | Boorman | G08G 5/0021 701/14 |
| 2011/0166723 A1 | 7/2011 | Valentova et al. | |
| 2011/0202208 A1 | 8/2011 | Kamik et al. | |
| 2011/0264312 A1 | 10/2011 | Spinelli et al. | |
| 2012/0053760 A1 | 3/2012 | Burnside et al. | |
| 2013/0026299 A1 | 1/2013 | Constans et al. | |
| 2013/0204470 A1 | 8/2013 | Luckner et al. | |
| 2013/0218374 A1 | 8/2013 | Lacko et al. | |
| 2013/0317671 A1* | 11/2013 | Magana Casado | G05D 1/101 701/3 |
| 2014/0148979 A1* | 5/2014 | De Prins | G08G 5/025 701/3 |
| 2014/0343764 A1* | 11/2014 | Sacle | B64D 45/04 701/16 |
| 2014/0343765 A1 | 11/2014 | Suiter et al. | |
| 2014/0343766 A1 | 11/2014 | Le Gall et al. | |
| 2015/0127196 A1 | 5/2015 | Ishihara et al. | |
| 2015/0151849 A1 | 6/2015 | Labastie et al. | |
| 2015/0205302 A1* | 7/2015 | Buisson | G05D 1/101 701/18 |
| 2016/0004374 A1 | 1/2016 | Kneuper et al. | |
| 2016/0063867 A1* | 3/2016 | Zammit | G08G 5/0039 701/18 |
| 2016/0085239 A1* | 3/2016 | Boyer | G08G 5/0021 701/5 |
| 2016/0107766 A1 | 4/2016 | He et al. | |
| 2016/0229554 A1 | 8/2016 | Kawalkar et al. | |
| 2016/0362194 A1* | 12/2016 | Boyer | G05D 1/0676 |
| 2017/0088284 A1 | 3/2017 | Holder | |
| 2017/0168658 A1* | 6/2017 | Lacko | G01C 23/005 |
| 2017/0243495 A1 | 8/2017 | Moravek et al. | |
| 2017/0358226 A1 | 12/2017 | Hodges et al. | |
| 2018/0130363 A1* | 5/2018 | Yvetot | G01C 23/00 |
| 2018/0276999 A1* | 9/2018 | Dacre-Wright | G08G 5/0052 |

OTHER PUBLICATIONS

EP Exam Report for Application 13154950.3 dated Jul. 19, 2018.
EP Search Report for Application No. 13154950.3-1810/2654029 dated Jun. 10, 2016.
EP Exam Report for 13154950.3 dated Jun. 22, 2016.
Extended EP Search Report for Application No. 16199228.4-1803 dated Apr. 26, 2017.
Becher, T.A., et al.; Methods for Maintaining Benefits for Merging Aircraft on Terminal RNAV Routes; 2004 IEEE.
Zadeh, V.T.; Fuzzy Logic Approach to Airplane Precision Instrument Approach and Landing; vol. 7, No. 4, Apr. 2012 ISSN 1819-6608 ARPN Journal of Engineering and Applied Sciences © 2006-2012 Asian Research Publishing Network (ARPN).
Ohme, P. A Model-Based Approach to Aircraft Takeo and Landing Performance Assessment; AIAA Atmospheric Flight Mechanics Conference Aug. 10-13, 2009, Chicago, Illinois.
Huisman, H. et al.; Crew Interfaces for Future ATM; Man Machine Integration Department National Aerospace Laboratory (NLR) Amsterdam The Netherlands;1997 IEEE.
Shish, K., et al.; Trajectory Prediction and Alerting for Aircraft Mode and Energy State Awareness.
Adami, T., et al.; An Energy Management Display for General Aviation Safety Enhancements; Ohio University Avionics Engineering Center, 33rd Digital Avionics Systems Conference, Colorado Springs, CO.
Croft, J.; Next-Generation EFBs Integral to NextGen Cockpit; Aviation Week & Space Technology; Retrieved from Internet [[http://aviationweek.com/aftermarket-solutions/next-generation-efbs-integral-nextgen-cockpit Jun. 5, 2018]].

* cited by examiner

METHODS AND SYSTEMS FOR STABILIZED APPROACH ENERGY MANAGEMENT

TECHNICAL FIELD

The subject matter described herein relates generally to vehicle systems, and more particularly, embodiments of the subject matter relate to aircraft systems capable of facilitating a stable approach to an airport in a manner that reduces a pilot's workload and comports with pilot experience.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization (e.g., the Flight Safety Foundation), a standards organization or other regulatory body, an airline, an aircraft manufacturer, or the like. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and the like.

Historically, flight crews relied on memorized manuals or acquired experience in performing approaches. If a stabilized approach is not performed, regulations may require the crew to commence a "go-around" procedure, however, in some instances, flight crews may disobey the regulations (e.g., to meet "on-time" metrics, minimize costs, or the like) or a flight crew in an unstabilized approach situation may believe that they will stabilize the aircraft in time for a safe landing. That said, unstabilized approaches have been shown to be a causal factor in several approach- and landing-related incidents. Furthermore, in situations where an aircraft needs to deviate from an original flight plan, such as an emergency, achieving a stabilized approach to a diversion destination can be even more difficult due to the unplanned nature of the descent.

To reduce pilot workload and better facilitate a stable approach, approach stabilization advisory systems have been developed that attempt to guide the flight crew through a stable approach in order to reduce the chances of a "go-around," increase safety, reduce fuel consumption, and/or reduce noise over the approach corridor. However, such systems may be constrained in a particular manner (e.g., to a particular trajectory, a particular sequence of aircraft configurations, and/or other constraints) and result in recommended actions during an approach which may not align with pilot experience. For example, the advised approach may involve flying the aircraft in a particular drag configuration for a longer duration than may be actually required or in an aircraft configuration that achieves greater drag than would otherwise be intuited by a pilot. Accordingly, it desirable to better facilitate a stable approach for an aircraft in a manner that is flexible and maintains situational awareness by avoiding potential conflicts with pilot experience.

BRIEF SUMMARY

Methods and systems are provided for assisting a vehicle for arriving at a destination in accordance with one or more stabilization criteria, such as, for example, an aircraft approaching an airport for landing. One exemplary method of assisting energy management of an aircraft on approach to an airport involves obtaining a current position of the aircraft from a system onboard the aircraft and determining a plurality of different scenarios for a path from the current position to a stabilization target position. Each scenario of the plurality of different scenarios comprises a sequence of a plurality of segments defining the path from the current position to the stabilization target position, and each segment of the plurality of segments has an associated aircraft configuration different from remaining segments of the plurality of segments associated with the respective scenario. The method further involves optimizing the scenarios by varying a respective speed associated with a respective aircraft configuration change for each segment of the plurality of segments associated with each respective scenario within a respective range of acceptable speeds for a respective aircraft configuration associated with the respective segment based on a spatial difference between the current position and the stabilization target position, selecting a recommended scenario from among the plurality of optimized scenarios, and providing a graphical indication of an aircraft configuration change corresponding to the recommended scenario on a display device onboard the aircraft.

An embodiment of a vehicle system is also provided. The system includes an onboard system to provide a current position of a vehicle, a display device onboard the vehicle, and a processing system coupled to the onboard system and the display device to determine a plurality of scenarios for traversing from the current position to a target position, identify a recommended scenario from among the plurality of scenarios, and provide graphical indication of one or more recommended configuration changes with respect to the vehicle in accordance with the recommended scenario. Each scenario of the plurality of scenarios comprises a sequence of a plurality of segments defining a path from the current position to the target position, and each segment of the plurality of segments for each scenario has an associated vehicle configuration different from remaining segments of the plurality of segments associated with the respective scenario. The respective entry speed associated with a respective starting position of one or more segments of the plurality of segments for each scenario is optimized within a range of acceptable speeds associated with the respective vehicle configuration associated with the respective one or more segments based on a relationship between the current position and the target position.

In yet another embodiment, a method of assisting energy management of an aircraft on approach to an airport involves obtaining, from a system onboard the aircraft, a current position of the aircraft, determining a stabilization target position associated with the approach, and determining an approach scenario for descending from the current aircraft altitude to an altitude associated with the stabilization target position from the current aircraft location to a location associated with the stabilization target position. The approach scenario comprises a sequence of a plurality of segments defining an approach path from the current position to the stabilization target position, and each segment of the plurality of segments has an associated aircraft configuration different from remaining segments of the plurality of segments associated with the approach scenario. The method optimizes the approach scenario based on a distance between the current aircraft location and the location associated with the stabilization target position and an altitude differential between the current aircraft altitude and the altitude associated with the stabilization target position by varying a respective entry speed associated with at least one segment of the plurality of segments and displays symbology indicative of an aircraft configuration change for the at least one segment, wherein the symbology also indicates the respective entry speed associated with the at least one segment.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
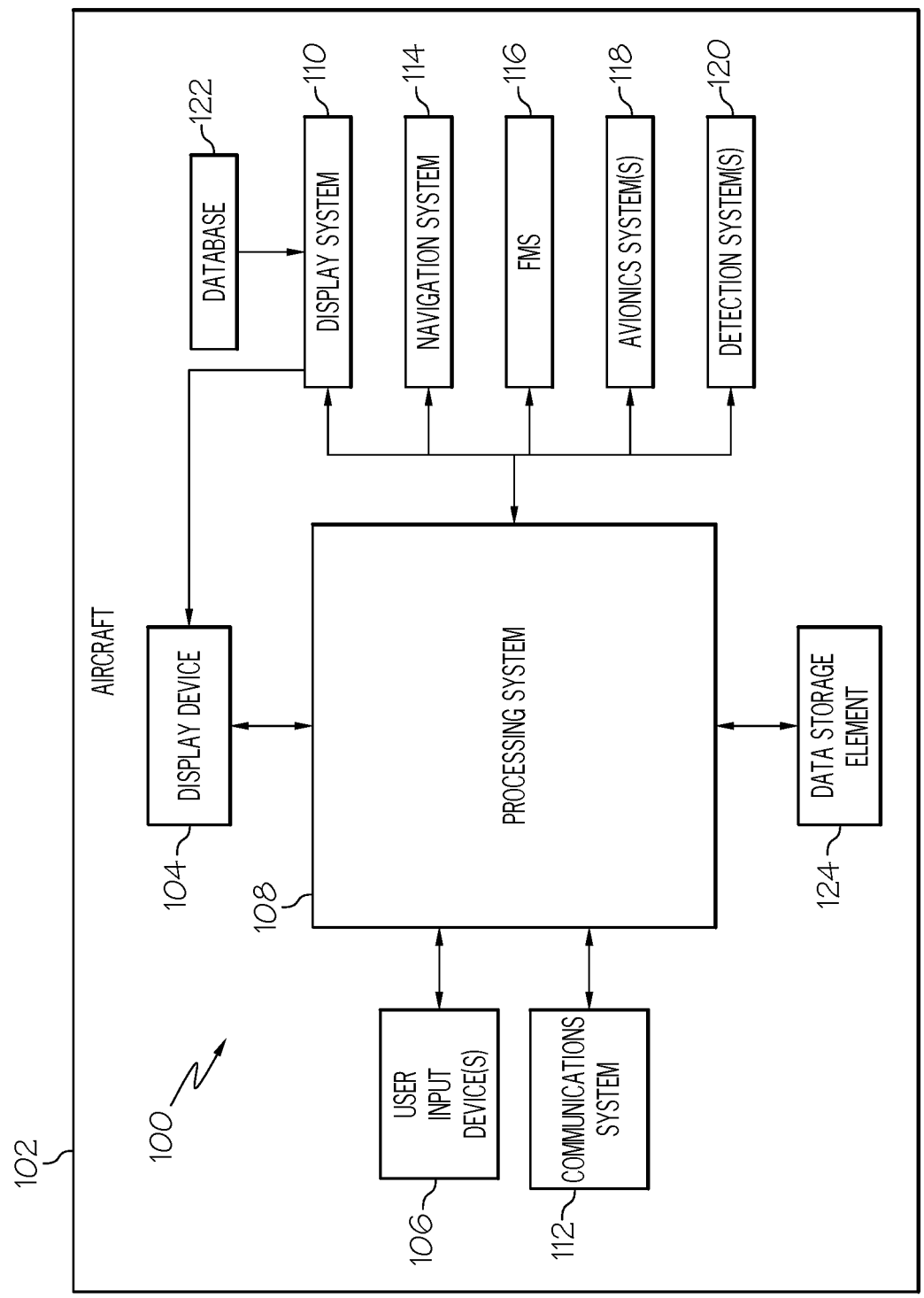
FIG. 1 is a block diagram of a system for an aircraft in an exemplary embodiment.

Embodiments of the subject matter described herein generally relate to systems and methods for facilitating a stable approach by a vehicle to a destination. As described in greater detail below, a stable approach is a navigational procedure that, when adhered to, ensures that the vehicle does not violate any applicable stabilization criteria (e.g., minimum and/or maximum travel rate limits, configuration or settings criteria for the vehicle, and the like) over a distance of travel proximate the destination. While the subject matter described herein could be utilized in various applications or in the context of various types of vehicles (e.g., automobiles, marine vessels, trains, or the like), exemplary embodiments are described herein in the context of determining a stable approach strategy for an aircraft that satisfies stabilization criteria upon reaching a particular point of the approach, alternatively referred to herein as the stabilization target. The stabilization target point of the approach represents a position relative to the airport where the aircraft should be stabilized for landing or otherwise commence a "go-around" procedure.

The stabilization criteria to be satisfied may include one or more of: a current aircraft speed equal to a desired target speed or within a desired range of speeds upon reaching the stabilization target point, a current aircraft descent rate less than or equal to a threshold descent rate upon reaching the stabilization target point, a particular aircraft configuration upon reaching the stabilization target point, a particular aircraft power setting upon reaching the stabilization target point, and/or a current aircraft heading upon reaching the stabilization target point that is aligned with or within a threshold of alignment with the intended runway. In this regard, U.S. Patent Publication No. 2013/0218374 provides an exemplary list of stabilization criteria that include an aircraft speed that is not more than 20 knots above the reference speed and not less than the reference speed (e.g., $V_{REF} \leq V \leq V_{REF}+20$ kt) and an aircraft descent rate that is not greater than 1000 feet per minute with the aircraft being in the correct landing configuration (e.g., landing gear extended, predefined flap angle, speedbrakes retracted, etc.) upon reaching a stabilization target point corresponding to a position along the approach that is 1000 feet above ground level (for instrument meteorological conditions) or 500 feet above ground level (for visual meteorological conditions). It should be noted that the correct landing configuration may be aircraft-specific and vary depending on the type of aircraft, and thus, the subject matter described herein is not intended to be limited to any particular aircraft configuration at the stabilization target position.

Embodiments of the subject matter described herein determine a recommended scenario for a stable approach path from the current position of the aircraft to a stabilization target position associated with an airport that results in the aircraft satisfying applicable stabilization criteria upon reaching the stabilization target position. In exemplary embodiments, a plurality of different scenarios for an approach path from the current position of the aircraft to the stabilization target position associated with the airport are initially determined. Each of the different scenarios involves a sequence of segments defining the approach path from the current aircraft position to the stabilization target position. Each segment of a respective scenario is associated with a particular aircraft configuration that is different from the aircraft configuration associated with other segments of that respective scenario. For example, one scenario may involve a segment with a first flap position, a segment with a second flap position, and a segment with the second flap position and landing gear extended. Another scenario may involve a segment with a first flap position, a segment with a second flap position and landing gear extended, and a segment with a third flap position and the landing gear extended. Yet another scenario may involve a segment with a first flap position and speedbrakes, a segment with a second flap position and landing gear extended and speedbrakes, and a segment with a third flap position and the landing gear extended and speedbrakes.

In exemplary embodiments, the set of different approach scenarios correspond to the different possible sequential combinations of aircraft configurations that may be employed during the approach to vary the amount of drag (e.g., flap positions, speedbrake settings, landing gear deployment, etc.) to satisfy stabilization criteria upon reaching the stabilization target position from the current aircraft position. For each potential sequence of aircraft configurations, the transition speeds at the start and end of each respective segment of the respective approach scenario are optimized according to a cost function to minimize a cost associated with the respective scenario. In this regard, the transition speeds at the start and end of a respective segment may be varied within a range defined by the maximum allowable speed and minimum default command speed associated with the particular aircraft configuration associated with the respective segment. Additionally, the flight path angles and lengths associated with the respective segments of the respective approach scenario are varied or otherwise optimized to fit the distance-to-go and amount of descent required between the current aircraft position and the stabilization target position of the approach. Thus, a multi-dimensional optimization is employed to arrive at the transition speeds and flight path angles associated with the different segments of each respective scenario. Any approach scenario where the sequence of aircraft configurations is unable to result in the aircraft satisfying the stabilization criteria upon reaching the stabilization target position is discarded from the set of different approach scenarios.

Once the different approach scenarios having optimized transition speeds are determined, a recommended scenario is selected or otherwise identified from among the different approach scenarios according to one or more selection criteria. For example, in one or more embodiments, the approach scenario having the lowest cost according to a cost function is identified as the recommended scenario from among the different approach scenarios. In this regard, the cost function utilized to identify a recommended scenario may be different from the cost function(s) utilized to determine the different potential approach scenarios. For example, the recommendation cost function may be configured so that the approach scenario involving the lowest amount of additional drag is identified as the recommended scenario having the lowest cost. In other embodiments, the recommendation cost function may be configured so that the approach scenario having the lowest transition speeds (or the smallest differences between optimized transition speeds and minimum default command speeds) is identified as the recommended scenario having the lowest cost. In yet other embodiments, the cost function may attempt to optimize the combination of the amount of additional drag and the transition speeds to identify the recommended scenario that achieves a desired tradeoff between the amount of additional drag and the increase in transition speeds. In this regard, increasing transition speeds may increase mechanical wear but improve passenger comfort and decrease noise by reducing the amount of drag or higher drag aircraft configurations utilized, while decreasing the transition speeds may increase the amount of drag or higher drag aircraft configurations required to fly the approach.

In other embodiments, the approach scenario having the minimum cumulative difference between the transition speeds associated with its respective segments and the minimum default command speeds associated with the aircraft configurations for the respective segments is identified as the recommended scenario. For example, a scenario where transition speeds vary from the minimum default command speeds relatively uniformly along the approach path may be recommended over a scenario where some segments have disproportionately larger deviations from the default command speed(s) to manage mechanical or physical stress on the aircraft and/or achieve more uniform or distributed wear across components. In some embodiments, scenarios involving a particular aircraft configuration or a combination of aircraft configuration and transition speed may be filtered or otherwise excluded from the different approach scenarios prior to identifying a recommended scenario from among the remaining approach scenarios. For example, scenarios where landing gear is extended at a transition speed above the default command speed (or default command speed range) for landing gear extension may be excluded from consideration to reduce noise. In this regard, it should be noted that there are numerous different selection, filtering, or optimization criteria that may be utilized to identify a recommended scenario from among the different potential approach scenarios, and the subject matter described herein is not necessarily limited to any particular manner for selecting or identifying the recommended scenario utilized for providing guidance to the flight crew.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
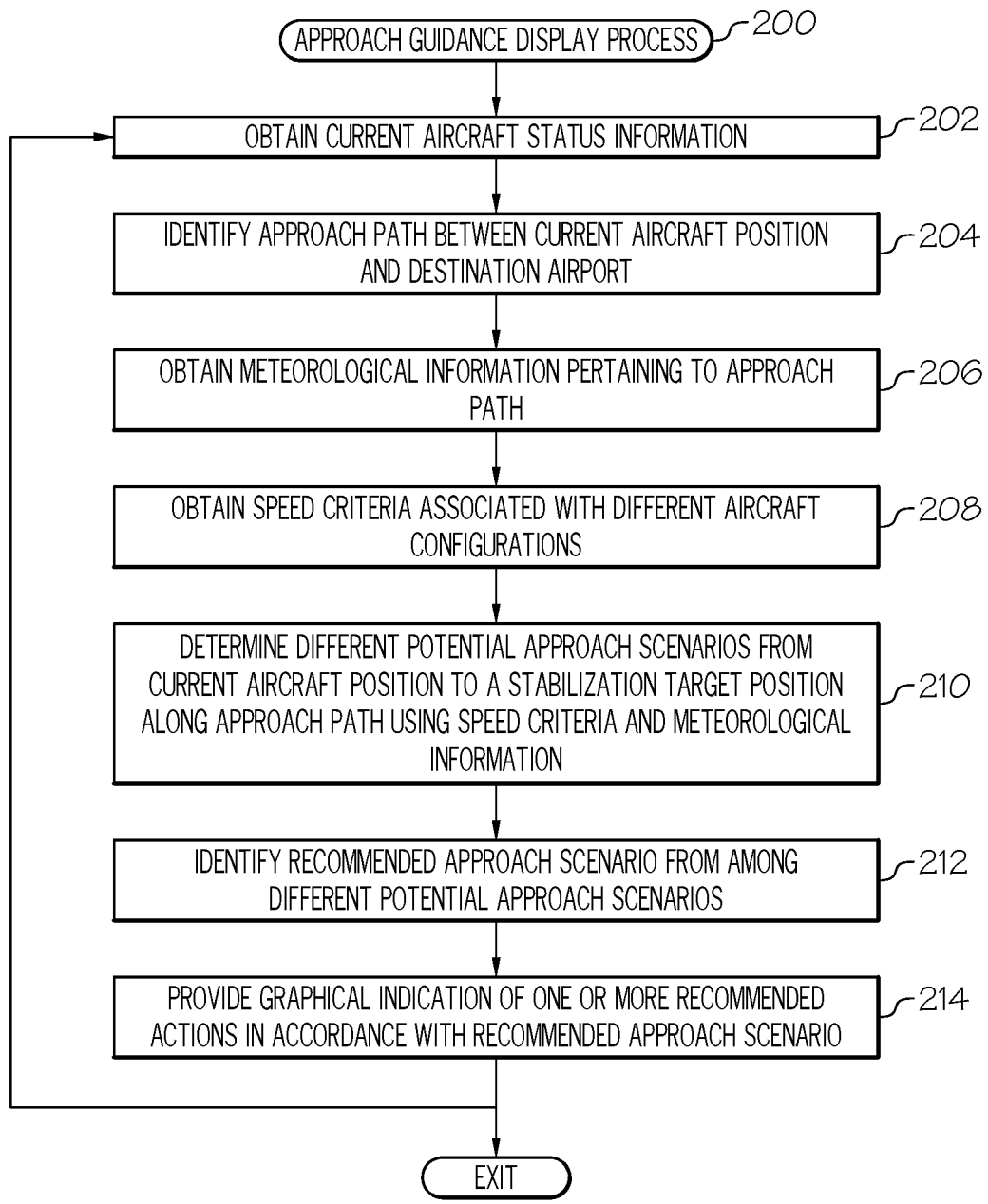
FIG. 2 is a flow diagram of an exemplary approach guidance display process suitable for use with the aircraft in the system of FIG. 1 in accordance with one or more embodiments.

Referring now to FIG. 2, in an exemplary embodiment, the aircraft system 100 is configured to support an approach guidance display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the approach guidance display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the approach guidance display process 200 may include any number of additional or alternative tasks, the tasks need not be performed in the illustrated order and/or the tasks may be performed concurrently, and/or the approach guidance display process 200 may be incorporated into a more comprehensive procedure or process having additional functionality not described in detail herein. Moreover, one or more of the tasks shown and described in the context of FIG. 2 could be omitted from a practical embodiment of the approach guidance display process 200 as long as the intended overall functionality remains intact.

The illustrated approach guidance display process 200 begins by obtaining current status information pertaining to the aircraft (task 202). The current status information pertaining to the aircraft 102 generally represents the instantaneous, real-time or most recent available values for one or more parameters that quantify the current operation of the aircraft 102. For example, the processing system 108 may obtain (e.g., from FMS 116, navigation system 114 and/or other avionic systems 118) the current location of the aircraft 102 (or a particular distance from a navigational reference point or a desired track), the current altitude (or above ground level) of the aircraft 102, the current heading (or bearing) of the aircraft 102, the current amount of fuel remaining onboard the aircraft 102, the current engine status (e.g., whether any engine is disabled, whether afterburners are in operation, the current revolutions per minute, and/or the like), and the current aircraft configuration (e.g., the current flap configuration).

The approach guidance display process 200 also identifies or otherwise determines the approach path to be flown between the current aircraft position and the destination airport (task 204). For example, based on the flight plan maintained by the FMS 116 or in an onboard data storage element 124, the processing system 108 may identify the approach procedure selected for the aircraft for the runway the aircraft is intended to land on at the destination airport. In this regard, the approach procedure may identify or otherwise include navigational reference points (or waypoints) that define the route to be flown en route to the airport for landing at the desired runway. Additionally, in some embodiments, the approach procedure may define altitude criteria associated with one or more of the navigational reference points that may constrain the approach flight path (e.g., altitude minima or maxima).

In exemplary embodiments, the approach guidance display process 200 also receives or otherwise obtains meteorological information pertaining to the approach path (task 206). For example, the processing system 108 may obtain, either from the onboard detection systems 120 or an external system via communications system 112, current meteorological conditions pertaining to the current position of the aircraft 102, such as, for example, the current temperature, wind speed, wind direction, atmospheric pressure, turbulence, and the like. The processing system 108 may also obtain current or real-time meteorological information pertaining to the approach path between the current aircraft position and the airport from one or more of the onboard detection system(s) 120 and/or any external weather monitoring system(s) via the communications system 112. Additionally, the processing system 108 may obtain forecasted meteorological information for points or locations on or around the approach path from one or more of the onboard detection system(s) 120 and/or any external weather monitoring system(s) for forecast time periods between the current time and the estimated time when the aircraft is expected to traverse a respective portion of the approach path. It should be noted that the obtained meteorological information may be three-dimensional to account for potential changes in the flight level or altitude of the aircraft 102 during execution of an approach.

In some embodiments, the processing system 108 also correlates or otherwise translates the meteorological information to navigational reference points along the approach path. For example, meteorological information for points that are not along the approach path may be correlated or translated to nearby navigational reference points along the approach path. Meteorological information may be integrated, fused, extrapolated, interpolated, or otherwise combined to achieve likely meteorological information at or near the location associated with a particular navigational reference point that may be utilized for navigating the aircraft 102. Moreover, in some embodiments the meteorological information corresponding to different locations may be further integrated, fused, extrapolated, interpolated, or otherwise combined to achieve likely meteorological information for points along the approach path that otherwise intervene between navigational reference points or between the aircraft 102 and respective navigational reference points. Thus, meteorological data points may be essentially translated from a meteorological weather grid domain to a navigational reference point domain that can be utilized for navigating the aircraft 102.

Still referring to FIG. 2, the approach guidance display process 200 identifies or otherwise obtains speed criteria associated with different configurations of the aircraft and then generates or otherwise determines a plurality of different potential approach scenarios for flying the aircraft along the approach path between the current aircraft position and a stabilization target position using the speed criteria and the obtained meteorological information (tasks 208, 210). For each potential aircraft configuration, the data storage element 124 may maintain one or more of a maximum allowable speed for that aircraft configuration and a default command speed (or speed range) for transitioning into that aircraft configuration. In this regard, the maximum allowable speed represents the maximum speed set by aircraft manufacturer that prevents damage to the aircraft due to excessive forces applied on aircraft structures in the corresponding aircraft configuration, and the default command speed represents the recommended speed for transitioning to the corresponding aircraft configuration that prevents stall while also providing a safety margin for the given configuration, aircraft weight, and potentially other factors. Each potential aircraft configuration may be defined by a unique combination of an engine operating status (e.g., a number of engines in operation), a flap position, a speedbrake status (e.g., whether or not speedbrakes are being employed), and a landing gear status (e.g., whether or not landing gear are deployed). Additional parameters or criteria may be utilized to further define potential aircraft configurations, such as, for example, whether or not the aircraft is descending or flying in level flight, such as is described in Table 1 of U.S. Patent Publication No. 2013/0218374. For each potential aircraft configuration, an aircraft manufacturer may prescribe speed criteria that define safe operating ranges when in that particular configuration, along with the default command speed for transitioning into that aircraft configuration during an idle descent.

Based on the current aircraft configuration, a plurality of different potential sequences of aircraft configurations may be determined based on the available potential aircraft configurations. In exemplary embodiments, each of the potential sequences progresses from the current aircraft configuration through one or more additional aircraft configurations successively providing an increased amount of drag. For each potential sequence of aircraft configurations, a potential approach scenario is determined that includes a plurality of different sequential approach segments, where each of the different segments is associated with a respective one of the aircraft configurations in the sequence. The potential approach scenario also identifies the aircraft speed at the start of a respective segment (i.e., the speed at which a respective change in configuration of the sequence should occur) along with the flight path angle associated with a respective segment.

In exemplary embodiments, to determine the different approach scenarios, the stabilization target position is identified as a position on the glide slope for the approach path at the desired stabilization height above the airport (e.g., the location along the glide slope path that is 1000 feet above ground level for instrument conditions). For each different approach scenario, the respective distance (or length) of each respective segment and the respective altitude descended (or flight path angle) of each respective segment is optimized or otherwise adjusted so that the sequence of segments fits between the stabilization target position and the current aircraft position. In this regard, the transition speeds at the start of each segment are allowed to vary within the range of acceptable speeds for the respective aircraft configuration associated with that respective segment.

In exemplary embodiments, the processing system 108 determines the respective transition speeds and flight path angles for the respective segments of an approach scenario by working backwards from the stabilization target position to the current aircraft position and based on an assumption of the aircraft satisfying the stabilization criteria at the stabilization target position. That said, in other embodiments, the processing system 108 may determine the transition speeds and flight path angles for the respective segments working forward from the current aircraft position. In exemplary embodiments, the data storage element 124 stores or otherwise maintains a flight model quantifying or otherwise describing deceleration characteristics of the different configurations of the aircraft 102. The processing system 108 utilizes the model to calculate or otherwise determine a lateral distance required for the aircraft to decelerate and traverse the respective segment in a stable manner based on the current and/or forecasted meteorological conditions pertaining to the segment (e.g., headwinds, tailwinds, or the like), the current and/or predicted aircraft weight at various stages of the approach, any current speed and/or altitude constraints from air-traffic control or defined by the approach procedure, and the like. The approach scenarios determined by the processing system 108 thereby satisfy applicable stabilization criteria at the stabilization target position while also transitioning to/from different aircraft configurations within the acceptable speed ranges for the respective aircraft configurations. In this regard, in some embodiments, when a particular sequence of aircraft configurations is unable to satisfy applicable stabilization criteria at the stabilization target position based on the current aircraft status, the potential approach scenario corresponding to that respective sequence of aircraft configurations may be discarded or otherwise excluded from analysis as being unusable.

In one or more embodiments, the transition speeds and flight path angles associated with the respective segments for each of the different potential approach scenarios are optimized to fit the current distance-to-go and altitude descent required to reach the stabilization target position from the current aircraft position while minimizing the deviation relative to the glide slope path. In one embodiment, the algorithm optimizes a function that calculates the distance and altitude lost in a respective segment (s) based on the variable segment entry speed ($v_s$) within the range of acceptable speeds for transitioning into the respective aircraft configuration associated with the respective segment, the variable segment exit speed ($v_{s+1}$) within the range of acceptable speeds for transitioning into the next successive aircraft configuration following the respective segment (or within the speed range defined by the stabilization criteria for the stabilization target point for the last segment of the sequence), and the flight path angle ($\alpha_s$) associated with the respective segment. In this regard, the total length of the scenario (L) may be determined as a sum of the lengths of the individual segments ($L_s$) using equation $L = \Sigma L_s(v_s, v_{s+1}, \alpha_s)$, where the lengths of the individual segments are calculated as a function of the variable segment entry speed ($v_s$), the variable segment exit speed ($v_{s+1}$), and the flight path angle ($\alpha_s$) using the appropriate aircraft model and meteorological conditions. The total altitude descended for the scenario (H) may similarly be determined as a sum of the descents of the individual segments ($H_s$) using equation $H = \Sigma H_s(c, \alpha_s)$, where the altitude descended for the individual segments are calculated as a function of the flight path angle ($\alpha_s$) and aircraft configuration at the segment $H_s(c)$ using the appropriate aircraft model and meteorological conditions.

In exemplary embodiments, the variable segment entry/exit speeds and the flight path angles are optimized minimize the difference between the total length L of the approach scenario and the distance-to-go (dtg) between the current aircraft location and the location of the stabilization target point (|L−dtg|) and minimizing the difference between the total altitude descended H and the altitude difference (alt) between the current aircraft altitude and the altitude of the stabilization target point (|H−alt|), while also observing the constraints that the total length L is less than the distance-to-go (L≤dtg) between the current aircraft location and the location of the stabilization target point, the total altitude descended H is less than the altitude differential between the current aircraft altitude and the altitude of the stabilization target point (H≤alt). Additionally, one or more other subsidiary optimizations may be performed (e.g., noise minimization, thrust minimization, passenger comfort maximization, etc.) in concert with optimizing the fit of the scenario to the current situation of the aircraft with respect to the airport. When optimizing an approach scenario, the variable segment entry speed ($v_s$) for each respective segment is constrained to be less than the maximum speed for transitioning to the respective aircraft configuration associated with the respective segment (e.g., $v_s < v_{max}$) and greater than or equal to the minimum default command speed (e.g., $v_s \geq v_{com\_min}$), while also being maintained greater or equal to the variable segment exit speed (e.g., $v_s \geq v_{s+1}$), which also corresponds to the variable segment entry speed for transitioning to the respective aircraft configuration associated with the following segment. For the final segment, the variable segment exit speed is also constrained to be within the stabilization criteria for the stabilization target position (e.g., $v_{REF} \leq v_{s+1} \leq v_{REF} + 20$ knots). Thus, the respective entry speed, flight path angle, and/or length associated with each segment of an approach scenario may be concurrently varied in concert with one another to optimize the overall approach scenario to best fit the current distance-to-go and altitude differential for reaching the stabilization target position with a stable speed (e.g., between $v_{REF}$ and $v_{REF} + 20$ knots) from the current aircraft position using the aircraft's flight model given the current aircraft speed, current aircraft gross weight, current meteorological conditions, and the like.

Referring again to FIG. 2, after determining the different potential approach scenarios, the approach guidance display process 200 continues by selecting, identifying, or otherwise determining a recommended approach scenario from among the different potential approach scenarios (task 212). In this regard, the processing system 108 identifies the potential approach scenario that best or most closely achieves a desired performance as the sequence of configuration changes that should be implemented based on the current aircraft status. In various embodiments, the processing system 108 may identify the recommended approach scenario as the potential approach scenario that minimizes or maximizes a desired performance criterion, such as, for example, a minimum fuel consumption, a minimum flight time, a minimum amount of drag added, a minimum deviation from a glide slope path angle, or the like. That said, in other embodiments, the processing system 108 may utilize a cost function to identify an optimal approach scenario that achieves a desired tradeoff among a plurality of different performance criteria. In this regard, it should be appreciated that there are any number of different potential tradeoffs or cost functions that could be constructed, with different relative weightings assigned to the different performance criteria as desired by a particular pilot or aircraft operator, and the subject matter is not necessarily limited to any particular manner of identifying the recommended approach scenario.

In one exemplary embodiment, the processing system 108 utilizes a cost function to identify the approach scenario that best fits the current distance-to-go and the current altitude difference between the current aircraft position and the stabilization target position. For example, to asymmetrically penalize larger deviations from the current distance-to-go and altitude difference and assuming the approach takes place at or near the glide slope path angle, the objective function to be minimized may be represented as a function of the total length (L) and total altitude descended (H) by the equation $$OF_{fit} = \left[ \frac{(dtg - L)^2}{\text{erf}(dtg - L)} + \frac{(alt - H)^2 \times dtg^2}{\text{erf}(alt - H) \times alt^2} \right].$$

In some embodiments, a cumulative cost function may be constructed that also accounts for one or more additional parameters, so that the approach scenario identified as recommended may achieve a desired tradeoff between how close the scenario fits the current distance-to-go and altitude difference while also attempting to minimize fuel consumption, travel time, and/or the like. For example, in one embodiment, a cost function is created to identify the potential approach scenario that best fits the current distance-to-go and altitude situation (e.g., by minimizing the value of $OF_{fit}$) while also minimizing added stress or wear on the aircraft by minimizing the difference between the variable segment entry speeds determined for the respective scenario and the minimum default command speeds for the respective aircraft configurations of the respective scenario (e.g., by minimizing the cumulative deviation from the minimum default command speeds along the scenario $\Sigma(v_s - v_{com})$). Thus, the approach scenario that minimizes the equation $OF_{fit} + \Sigma(v_s - v_{com})$ may be identified as the one that best fits the current position of the aircraft while minimizing mechanical or physical stress on the aircraft.

Still referring to FIG. 2, the approach guidance display process 200 generates or otherwise provides a graphical indication of one or more recommended actions to be undertaken by the pilot to achieve a stable approach in accordance with the recommended approach scenario (task 214). In this regard, the processing system 108 may generate or otherwise provide a graphical user interface (GUI) display that includes one or more GUI elements that indicate, to the pilot, co-pilot, or other crew member operating the aircraft 102, a configuration change should be initiated to facilitate a stable approach. In exemplary embodiments, the GUI element indicating the configuration change utilizes a symbology that corresponds to or otherwise indicates the type of configuration change to be initiated. For example, a change in flap configuration may be indicated with a unique symbology that is different from the symbology utilized to indicate speedbrakes.

In one or more exemplary embodiments, the approach guidance display process 200 is configured to periodically or continually repeat throughout the approach phase of flight to dynamically update the recommended approach scenario in response to changes in the energy of the aircraft. For example, if a pilot chooses to deviate from the initially recommended approach scenario, the approach guidance display process 200 may dynamically update the recommended approach scenario in real-time as dictated by the current aircraft status. That is, as the distance-to-go for reaching the stabilization target position decreases or the altitude necessary to descend to reach the stabilization target position increases and/or decreases, the approach guidance display process 200 may determine an updated recommended approach scenario that best fits the updated distance-to-go and altitude differential. By virtue of the variable transitions speeds and flight path angles, the subject matter described herein allows for a stable approach to still be achieved for a wider range of energy situations, thereby reducing the likelihood of a potentially unnecessary go-around.

Figure 3:
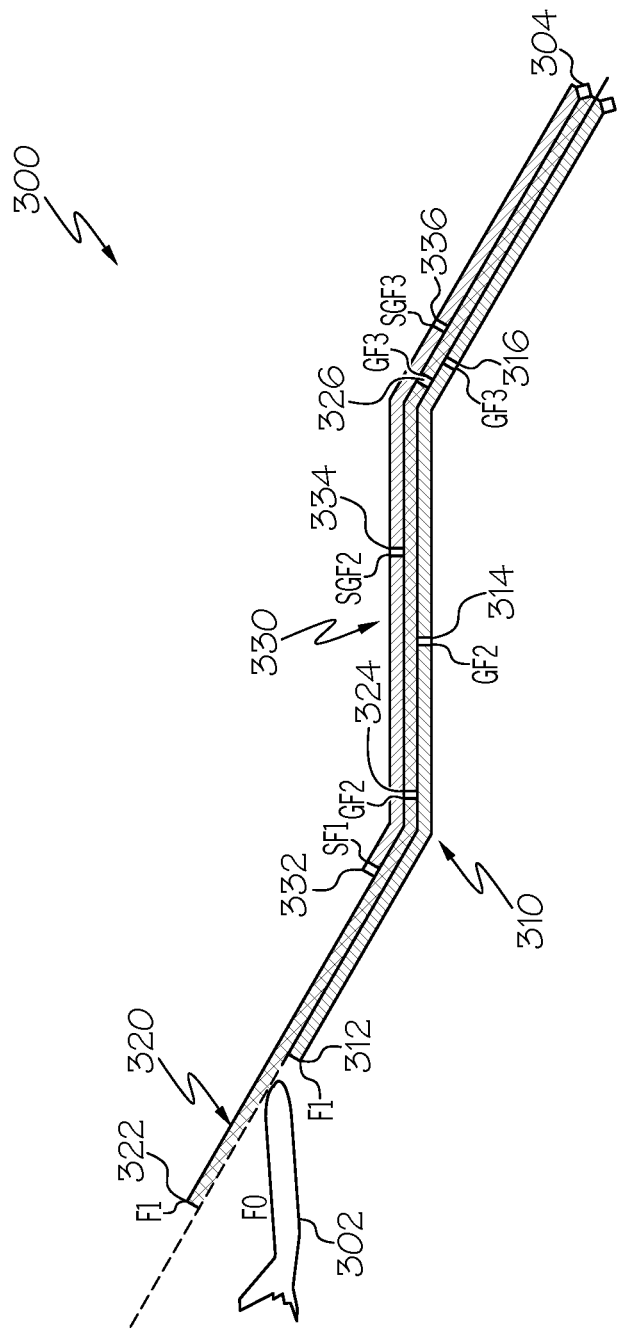
FIG. 3 depicts a vertical profile of exemplary approach scenarios in accordance with one or more embodiments.

FIG. 3 depicts an exemplary vertical profile 300 including a plurality of different approach scenarios for descending from a current aircraft position 302 and reaching a stabilization target position 304 along the glide slope path (e.g., at 1000 feet above ground level) while satisfying one or more stabilization criteria for a stable approach. For example, the approach scenarios may be configured to achieve an aircraft speed upon reaching the stabilization target position 304 that is equal to a stable approach speed criterion ($v_{final} = v_{REF}$) or within a desired threshold amount or percentage of the stable approach speed criterion (e.g., $v_{REF} \leq v_{final} \leq v_{REF}$ 20 kts). In the illustrated embodiment, based on the current aircraft position 302, the current status of the aircraft (e.g., the current airspeed, current weight, current flap configuration not extended (F0), etc.), the approach guidance display process 200 determines a recommended approach scenario 310 that includes an initial segment defined by transition points 312 and 314, where flaps are extended to a first position (F0) at the initial transition position 312, followed by an intermediate segment defined by transition points 314 and 316, where flaps are extended to a second position (F2) and landing gear is extended (G) at the second transition position 314 (GF2), and a final segment defined by transition position 316 and the stabilization target position 304, where flaps are extended to a third position (F3) while landing gear is maintained extended upon reaching the final transition position 316 (GF3).

As described above, in exemplary embodiments, the recommended approach scenario 310 represents the potential approach scenario that best fits the current distance-to-go and altitude difference between the current aircraft position 302 and the stabilization target position 304. Additionally, the recommended approach scenario 310 may also minimize the amount of drag (e.g., no speedbrake segments) or otherwise optimize performance while en route to the stabilization target position 304. In this regard, by virtue of varying the transition speeds and flight path angles for the segments, the recommended approach scenario 310 may satisfy stabilization criteria at the stabilization target position 304 while maintaining idle descent and without requiring the use of speedbrakes.

To contrast the approach guidance display process 200 and subject matter described herein, FIG. 3 also depicts alternative approach scenarios 320, 330 where the transition speeds and flight path angles are fixed, predetermined, or otherwise constrained to the default command speed (or default command speed ranges) for the respective configurations. For example, approach scenario 320 illustrates backward constructed path from the stabilization target position 304 to arrive at an initial segment defined by transition points 322 and 324, where flaps are extended to a first position at the initial transition position 322, followed by an intermediate segment defined by transition points 324 and 326, where flaps are extended to a second position and landing gear is extended at the second transition position 324, and a final segment defined by transition position 326 and the stabilization target position 304, where flaps are extended to a third position while landing gear is maintained extended upon reaching the final transition position 326. However, by virtue of the aircraft being in a higher energy state at the current aircraft position 302 without having extended flaps to the first position at the default speed, a different approach scenario 330 determined in accordance with the default command speed(s) may otherwise be recommended in lieu of the approach scenario 320. Approach scenario 330 includes an initial segment defined by transition points 332 and 334, where flaps are extended to a first position while also operating speedbrakes (S) at the initial transition position 332, followed by an intermediate segment defined by transition points 334 and 336, where flaps are extended to a second position and landing gear is extended while maintaining application of speedbrakes at the second transition position 334, and a final segment defined by transition position 336 and the stabilization target position 304, where flaps are extended to a third position while landing gear is maintained extended and speedbrakes remain applied. Thus, conventional approaches may result in the aircraft flying with an excessive amount of drag later in the approach as a pilot deviates from the default command speeds (or speed ranges), which may conflict with the pilot's experience or expectation of how the approach should be flown.

Figure 4:
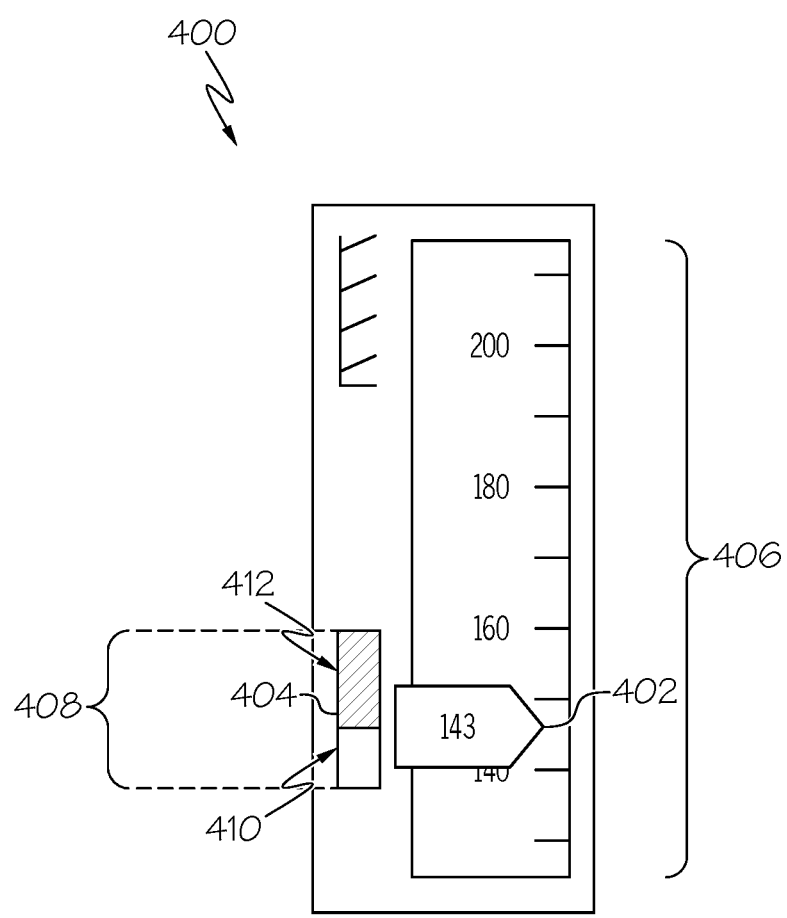
FIGS. 4-5 depict exemplary graphical user interface (GUI) displays including graphical indicia of a recommended aircraft configuration change suitable for presentation on a display device in the aircraft system of FIG. 1 in conjunction with the approach guidance display process of FIG. 2 in accordance with one or more embodiments.

FIG. 4 depicts an exemplary embodiment of an airspeed GUI display 400 that includes a graphical indication 402 of a current speed of the aircraft and symbology 404 indicative of a recommended configuration change for the aircraft with respect to a vertical axis 406 for the speed of the aircraft. The configuration change symbology 404 has a dimension 408 (or length) with respect to the reference axis 406 that corresponds to the range of speeds for which the configuration change could be performed. For example, the illustrated configuration change symbology 404 extends from a default command speed for the configuration change of 140 knots to a maximum allowable speed for the configuration change of 160 knots. The configuration change symbology 404 includes a first portion 410 rendered with a visually distinguishable characteristic and a dimension that corresponds to the difference between the current aircraft speed 402 (e.g., 143 knots) and the default command speed and a second portion 410 rendered with a different visually distinguishable characteristic and a dimension that corresponds to the difference between the current aircraft speed 402 and the maximum allowable speed for the configuration change of 160 knots. The visually distinguishable characteristics utilized to differentiate the portions 410, 412 of the configuration change symbology 404 may be one or more of the following visually distinguishable characteristics, individually or in any combination thereof: different colors, different hues, different tints, different levels of transparency, translucency, opacity, contrast, brightness, or the like, different shading, texturing, fill patterns, and/or other graphical effects.

Referring to FIGS. 2-4, the dimensions of the portions 410, 412 of the configuration change symbology 404 may dynamically update as the current aircraft status changes to indicate, to the pilot, the relative amount of opportunity or time that the pilot has to make the configuration change before additional drag or another otherwise suboptimal approach scenario may be required. For example, flap configuration change symbology 404 may be automatically generated or otherwise displayed on the airspeed GUI display 400 upon the aircraft reaching an energy state (e.g., position 322) corresponding to the default command speed for extending the flaps to the first position, thereby indicating to the pilot that a configuration change to extend flaps is recommended to achieve a stable approach. As the aircraft travels and the energy situation changes without the configuration change (e.g., from position 322 to position 302), the approach guidance display process 200 may dynamically determine the updated recommended approach scenario 310 based on the current aircraft position 302 and airspeed 402 and update the dimensions of the portions 410, 412 to reflect the relationship between the current airspeed 402 and the speed range for the recommended flap configuration change. Thus, rather than recommending an approach scenario with added drag (e.g., approach scenario 330) or that may otherwise be suboptimal, the pilot can deviate from the default command speed(s) as dictated by his or her experience with additional guidance (e.g., from portions 412, 414) indicating the relationship between the current aircraft speed 402 and the acceptable range 408 for the recommended configuration change without being recommended to increase drag or otherwise take unnecessary or undesirable actions.

Figure 5:
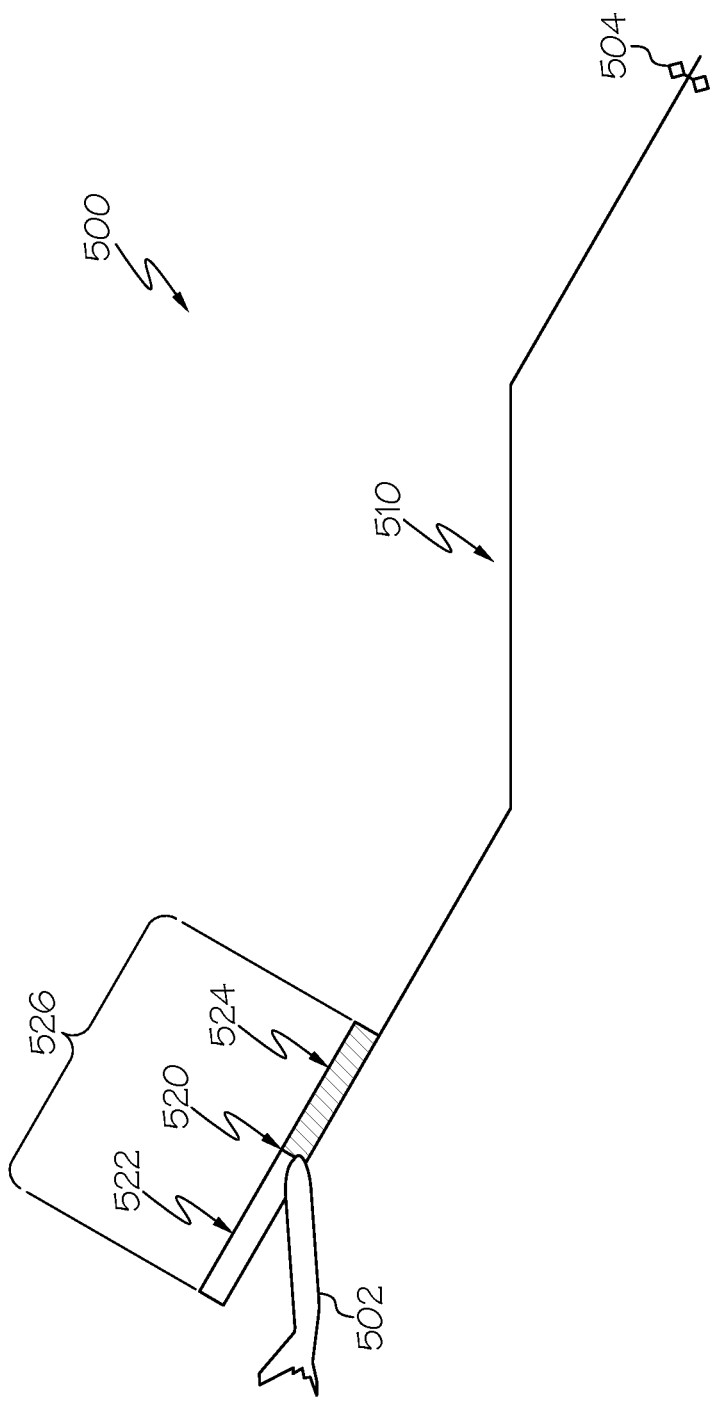

FIG. 5 depicts a vertical profile GUI display 500 that includes a graphical indication 502 of the current aircraft position with respect to an approach path 510 corresponding to a recommended approach scenario (e.g., approach scenario 310) from the current aircraft position 502 to a stabilization target position 504. The vertical profile GUI display 500 also includes symbology 520 indicative of a recommended configuration change for the aircraft with respect to the approach path 510. In this regard, similar to symbology 404, the configuration change symbology 520 has a dimension 526 (or length) with respect to the approach path 510 that corresponds to the range of speeds for which the configuration change could be performed, with visually distinguishable portions 522, 524 that represent the current aircraft speed with respect to the acceptable speed range 526.

The flap configuration change symbology 520 may be automatically generated or otherwise displayed on the vertical profile GUI display 500 upon the aircraft reaching position with an airspeed corresponding to the optimized variable entry speed for extending the flaps to the first position, with dimensions of the portions 522, 524 providing indication to the pilot of the recommended speed for extending the flaps relative to the range of allowable speeds for extending the flaps to the first position. As the aircraft travels to position 502 and the airspeed increases without extending the flaps, the respective dimensions of the portions 522, 524 may be dynamically updated to reflect the relationship between the current airspeed and the speed range for the recommended flap configuration change. Thus, the pilot is capable of deviating from the default command speed(s) as dictated by his or her experience with additional guidance (e.g., from portions 522, 524) indicating the relationship between the current aircraft speed and the acceptable range 526 for the recommended configuration change without being recommended to pursue a different approach scenario, increase drag, or otherwise take unnecessary or undesirable actions.

Referring to FIGS. 2 and 4-5, the GUI displays 400, 500 may be dynamically updated as the aircraft travels in response to changes in the current aircraft status. In this regard, if the pilot continues on the approach path without extending the flaps within the acceptable range 408, 526, the GUI displays 400, 500 may be dynamically updated to recommend a different approach scenario. As described above, by virtue of the approach guidance display process 200, the newly recommended approach scenario may be the potential approach scenario given the updated aircraft status that best fits the current distance-to-go and altitude differential while minimizing drag or optimizing other performance criteria.

By virtue of the subject matter described herein, the pilot or other vehicle operator is provided freedom to deviate from default speeds for configuration changes as dictated by personal experience or intuition rather than being recommended to increase drag or otherwise fly an approach in a non-intuitive manner. In other words, a pilot may be provided graphical cues or recommendations that facilitate a stable approach while minimizing additional drag and resolving high energy situations that could otherwise be deemed unrecoverable or result in unnecessary go-arounds using previous techniques. Additionally, the stable approach scenario recommended to the pilot may be optimized to fit the current distance-to-go and altitude of the aircraft while minimizing deviations from the glide slope path angle or otherwise optimizing one or more performance criteria.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting energy management of an aircraft on approach to an airport, the method comprising:
   obtaining, from a system onboard the aircraft, a current position of the aircraft;
   determining a plurality of different scenarios for a path from the current position to a stabilization target position, wherein each scenario of the plurality of different scenarios comprises a sequence of a plurality of segments defining the path from the current position to the stabilization target position, and each segment of the plurality of segments has an associated aircraft configuration different from remaining segments of the plurality of segments associated with the respective scenario;
   varying a respective speed associated with a respective aircraft configuration change for each segment of the plurality of segments associated with each respective scenario within a respective range of acceptable speeds for a respective aircraft configuration associated with the respective segment based on a spatial difference between the current position and the stabilization target position;
   selecting, from among the plurality of scenarios, a recommended scenario of the plurality of scenarios; and
   providing, on a display device onboard the aircraft, indication corresponding to the recommended scenario.

2. The method of claim 1, wherein varying the respective speed comprises varying a respective entry speed associated with the respective aircraft configuration change for each segment of the plurality of segments between a minimum default command speed and a maximum allowable speed for the respective aircraft configuration.

3. The method of claim 2, further comprising optimizing the respective entry speed associated with the respective aircraft configuration change for each segment of the plurality of segments to minimize a difference between the spatial difference between the current position and the stabilization target position and a spatial dimension of the respective scenario.

4. The method of claim 3, wherein optimizing the respective entry speed associated with the respective aircraft configuration change for each segment of the plurality of segments comprises varying the respective entry speed associated with the respective aircraft configuration change for each segment to minimize the difference between a distance-to-go between the current position and the stabilization target position and a total length of the respective scenario.

5. The method of claim 3, wherein optimizing the respective entry speed associated with the respective aircraft configuration change for each segment of the plurality of segments comprises varying a respective flight path angle associated with each segment to minimize the difference between an altitude differential between the current position and the stabilization target position and a total altitude descended by the respective scenario.

6. The method of claim 1, wherein selecting the recommended scenario comprises identifying a scenario of the plurality of scenarios that best fits a distance-to-go between the current position and the stabilization target position and an altitude differential between the current position and the stabilization target position as the recommended scenario.

7. The method of claim 1, wherein selecting the recommended scenario comprises identifying a scenario of the plurality of scenarios that minimizes additional drag.

8. The method of claim 1, wherein selecting the recommended scenario comprises identifying a scenario of the plurality of scenarios having a minimum cost.

9. The method of claim 1, wherein:
providing the indication comprises displaying symbology indicative of a recommended aircraft configuration change in accordance with the recommended scenario; and
the symbology indicates a relationship of a recommended speed for the aircraft configuration change with respect to the respective range of acceptable speeds for the respective aircraft configuration change.

10. A method of assisting energy management of an aircraft on approach to an airport, the method comprising:
obtaining, from a system onboard the aircraft, a current position of the aircraft, the current position comprising a current altitude and a current location of the aircraft;
determining a stabilization target position associated with the approach;
determining an approach scenario for descending from the current altitude to an altitude associated with the stabilization target position from the current location to a location associated with the stabilization target position, wherein the approach scenario comprises a sequence of a plurality of segments defining an approach path from the current position to the stabilization target position, and each segment of the plurality of segments has an associated aircraft configuration different from remaining segments of the plurality of segments associated with the approach scenario;
optimizing the approach scenario based on a distance between the current location and the location associated with the stabilization target position and an altitude differential between the current altitude and the altitude associated with the stabilization target position by varying a respective entry speed associated with at least one segment of the plurality of segments; and
displaying, on a display device, symbology indicative of an aircraft configuration change for the at least one segment, wherein the symbology indicates the respective entry speed associated with the at least one segment.

11. The method of claim 10, wherein:
varying the respective entry speed comprises varying the respective entry speed within a range defined by a minimum default command speed for transitioning to the aircraft configuration associated with the respective segment and a maximum allowable speed for transitioning to the aircraft configuration associated with the respective segment; and
the symbology indicates a relationship between the respective entry speed and the range.

12. The method of claim 11, wherein the symbology comprises a first portion having a first dimension corresponding to a first difference between the respective entry speed and the minimum default command speed and a second portion having a second dimension corresponding to a second difference between the respective entry speed and the maximum allowable speed.

13. The method of claim 10, wherein varying the respective entry speed comprises varying the respective entry speed within a range defined by a minimum default command speed for transitioning to the aircraft configuration associated with the respective segment and a maximum allowable speed for transitioning to the aircraft configuration associated with the respective segment to minimize a first difference between a total length of the approach scenario and the distance.

14. The method of claim 13, further comprising varying a respective flight path angle associated with the at least one segment of the plurality of segments to minimize a second difference between the altitude differential and a total altitude descended by the approach scenario.

15. The method of claim 10, further comprising varying a respective flight path angle associated with the at least one segment of the plurality of segments to minimize a difference between the altitude differential and a total altitude descended by the approach scenario.

16. The method of claim 10, further comprising dynamically updating the approach scenario and the symbology in response to a change in the current position of the aircraft.

17. The method of claim 10, wherein optimizing the approach scenario comprises:
for each segment of the plurality of segments, varying the respective speed associated with a respective starting position of the respective segment where a respective aircraft configuration change occurs within a range of acceptable speeds for the respective aircraft configuration associated with the respective segment.

18. The method of claim 17, wherein optimizing the approach scenario further comprises:
for each segment of the plurality of segments, varying one or more of a respective length and a respective flight path angle associated with the respective segment to fit the approach scenario to the distance and the altitude differential in concert with varying the respective speed associated with the respective segment.

19. A vehicle system comprising:
an onboard system to provide a current position of a vehicle;
a display device onboard the vehicle; and
a processing system coupled to the onboard system and the display device to determine a plurality of scenarios for traversing from the current position to a target position, identify a recommended scenario from among the plurality of scenarios, and provide graphical indication of one or more recommended configuration changes with respect to the vehicle in accordance with the recommended scenario, wherein:
each scenario of the plurality of scenarios comprises a sequence of a plurality of segments defining a path from the current position to the target position;
each segment of the plurality of segments for each scenario has an associated vehicle configuration different from remaining segments of the plurality of segments associated with the respective scenario; and
a respective entry speed associated with a respective starting position of one or more segments of the plurality of segments for each scenario is optimized within a range of acceptable speeds associated with the respective vehicle configuration associated with the respective one or more segments based on a relationship between the current position and the target position.

* * * * *